United States Patent [19]
Wilson

[11] 3,906,836
[45] Sept. 23, 1975

[54] SERVO-BOOSTERS FOR VEHICLE BRAKING SYSTEMS

[75] Inventor: Alexander John Wilson, Sutton Coldfield, England

[73] Assignee: Girling Limited, Birmingham, England

[22] Filed: Aug. 27, 1973

[21] Appl. No.: 391,532

[30] Foreign Application Priority Data
Sept. 8, 1972 United Kingdom............... 41763/72

[52] U.S. Cl......................... 91/369 B; 92/94; 92/99
[51] Int. Cl......... F15b 9/10; F01b 19/00; F16j 3/00
[58] Field of Search.......... 91/369 A, 369 B, 369 R; 92/98, 99, 101, 98 RD, 94

[56] References Cited
UNITED STATES PATENTS

| | | | |
|---|---|---|---|
| 2,989,033 | 6/1961 | Stelzer............................... | 91/369 B |
| 3,183,789 | 5/1965 | Stelzer............................... | 91/369 B |
| 3,237,525 | 3/1966 | Stelzer..................................... | 92/99 |
| 3,385,167 | 5/1968 | Wilson et al. ...................... | 91/369 B |
| 3,385,168 | 5/1968 | Fineman et al. ................... | 91/369 B |
| 3,772,963 | 11/1973 | Kita.................................. | 91/369 B |

*Primary Examiner*—Paul E. Maslousky
*Attorney, Agent, or Firm*—Scrivener Parker Scrivener and Clarke

[57] ABSTRACT

The invention is concerned with servo-boosters for vehicle braking systems of the type in which a load actuating member is displaceable by the application of differential fluid pressures to a movable wall and which include a valve arranged to selectably alter the pressure on one side of the wall relative to that on the other side, the valve including a flexible valve closure member and an annular deflecting plate for selectably deflecting the valve closure member to control the actuation of the booster.

According to one aspect of the invention the deflecting plate comprises an annular disc of resilient sheet material the surface of which is continuously corrugated with radial corrugations.

According to a second aspect of the invention, a mechanical connection is provided between the valve body and the deflecting plate at a location radially outwardly of the valve closure member.

According to a third aspect of the invention, an inwardly directed flange portion of a piston skirt supporting the booster diaphragm is coned relative to the booster axis in the unactuated state of the booster such that its inner end engages the deflecting plate at a region inwardly of the periphery thereof but which is deformed so as to lie normal to the booster axis and flat against the deflecting plate when a predetermined pressure differential across the diaphragm has been exceeded.

7 Claims, 6 Drawing Figures

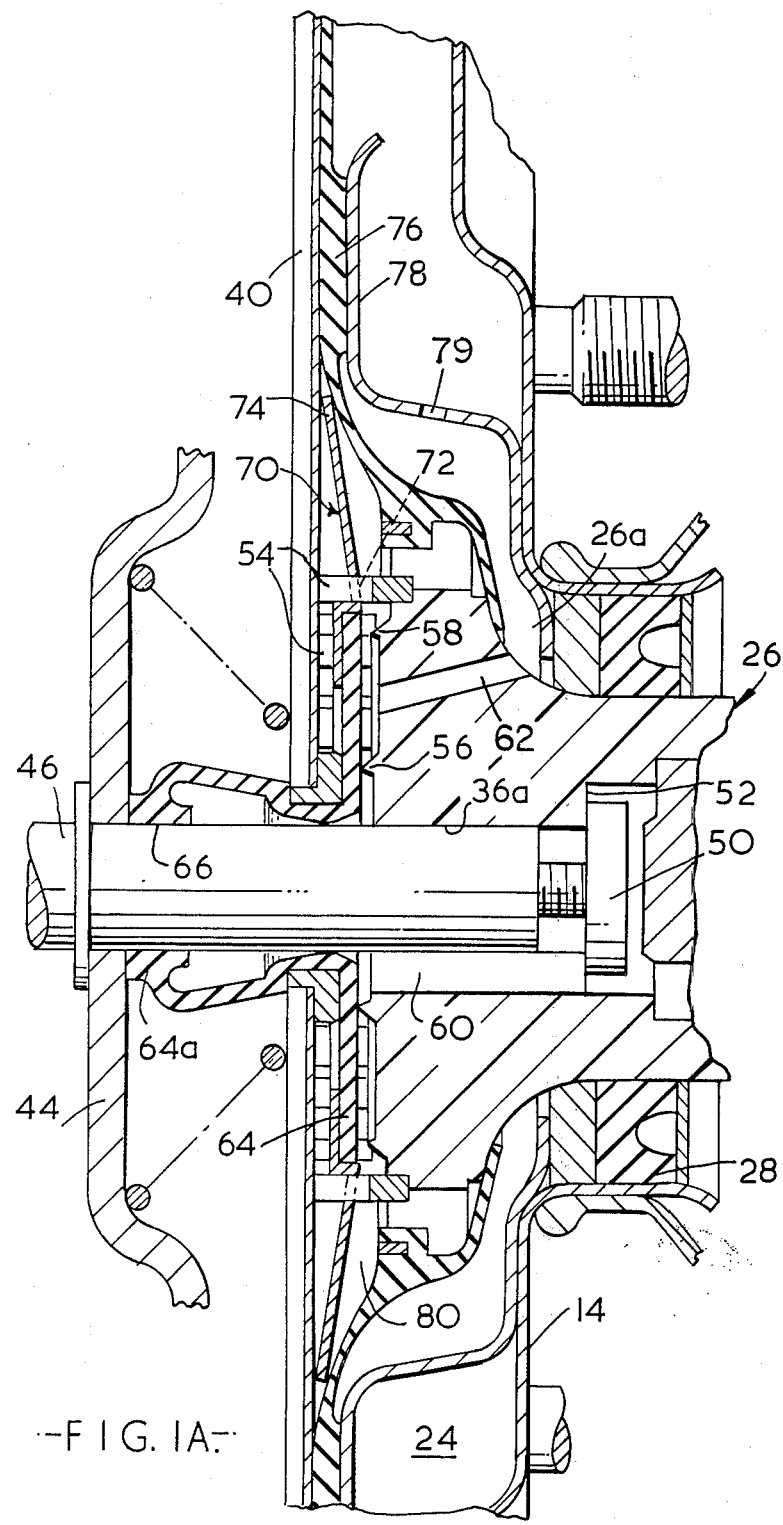
-FIG. IA.-

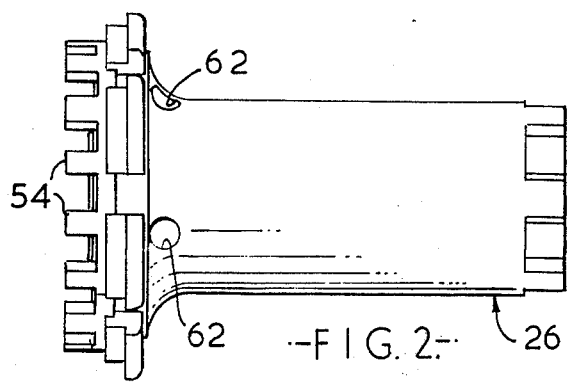
–FIG. 2–
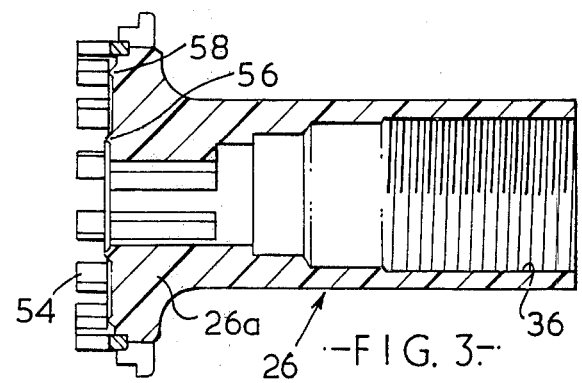
–FIG. 3–
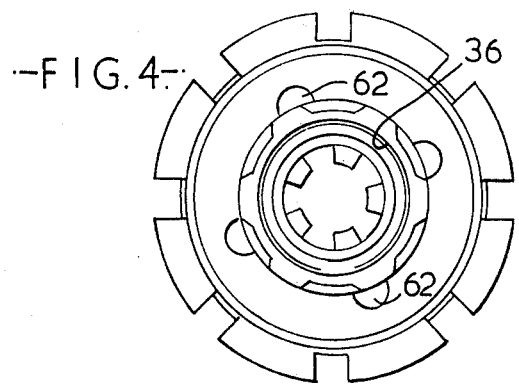
–FIG. 4–

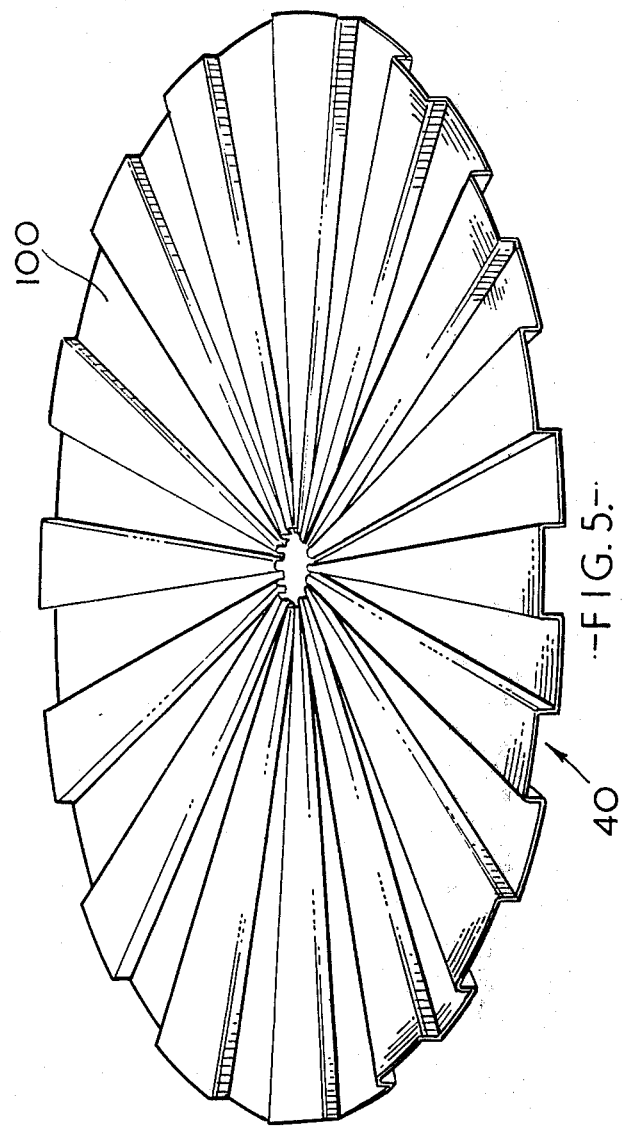

SERVO-BOOSTERS FOR VEHICLE BRAKING SYSTEMS

The present invention relates to servo-boosters for vehicle braking systems and is particularly concerned with differential-pressure operated boosters of the type in which a load-actuating member is displaceable by the application of differential fluid pressures to a movable wall.

Systems employing such boosters are known which function under the control of a valve which is arranged to alter the pressure on one side of the movable wall relative to that on the other side, and it is recognised that it is desirable to provide on the operating member of the valve, a reaction which the operator can sense and which is proportional to the degree of pressure differential established between the two sides of the wall. In a vehicle braking system, the operator then experiences the "feel" of the brakes, which assists him to control the extent to which they are applied.

One convenient way of providing the required reaction or "feel" is to arrange for the movable wall to be deformed conically responsive to the pressure differential when the booster is energised and to transmit the reaction resulting from this deformation back to the operator. For this purpose, it has already been proposed to construct the movable wall as an annular elastic diaphragm which is supported by a so-called deflecting plate constructed so as to be capable of dishing or coning responsive to differential pressures on its two sides.

It is already known from our prior British Pat. Nos. 1,144,566 and 1,144,567 for the deflecting plate to comprise a plurality of rigid, individual, radial fingers carried in mutually displaceable relation by support means which simultaneously maintain said fingers in regularly, circularly spaced and radially fixed locations, thereby to define a radially slotted, annular plate.

It is also known from our prior British Pat. No. 1,022,419 for the deflecting plate to comprise an annular disc of resilient or flexible sheet material which is formed with a plurality of angularly spaced, radially directed flutes whose axial depth tapers from a maximum at their radially inner end to a minimum or zero at the periphery of the disc.

According to one aspect of the present invention, the deflecting plate comprises an annular disc of resilient sheet material, the surface of which is continuously corrugated with radially extending corrugations.

Preferably, the corrugations extend from the inner to the outer periphery of the disc and the corrugations are formed such that the disc is of uniform overall thickness.

It is known from our prior British patent specification No. 1,144,567 for the valve controlling the differential pressure across the movable wall to comprise a valve body member formed with a pair of radially spaced passage means, a pair of relatively stationary and substantially concentric annular valve seats on said member, the inner one of said valve seats circumscribing one of said passage means and the outer of said valve seats circumscribing both of said passage means, and a common, annular valve closure member selectively engageable with and capable of conically deforming about the whole circumference of each seat to respectively connect or disconnect said passage means. The valve closure member is made of rubber and is supported by said previously mentioned deflecting plate which is arranged to be conically distorted on movement of said valve body member to control the position of the valve closure member relative to the valve seats.

In the aforegoing arrangement, the rubber valve closure member is caused to carry and transmit the full input load of the booster from the valve body member to the deflecting plate which can result in a disadvantageous compression of the rubber.

According to a second aspect of the present invention, said input load of the booster is transmitted directly from the valve body member to the deflecting plate at a location radially outwardly of the annular valve closure member.

Conveniently, this is achieved by the provision of a plurality of projections or castellations on the valve body member which engage the radially corrugated deflecting plate.

Advantageously, the radially inner of said valve seats extends slightly further forward in the axial direction than the outer seat so that a clearance exists between the valve closure member and the outer seat in the unactuated state of the booster.

Preferably, an annular plate member is provided which is connected to the valve closure member and is adapted to engage the deflecting plate at a location radially outwardly of said castellations or projections whereby to aid the closure of the outer valve on conical deformation of the deflecting member.

According to a third aspect of the invention, the diaphragm is circumferentially supported by a so-called piston skirt which is formed of resilient material and which has a cylindrical portion which lies radially outwardly of the deflecting plate and an inwardly extending flange portion which is coned relative to the booster axis in the unactuated state of the booster such that its inner end engages the deflecting plate at a region inwardly of the periphery thereof but which is deformed so as to lie normal to the booster axis and flat against the deflecting plate when a predetermined pressure differential across the diaphragm has been exceeded, whereby to increase the effective area of the diaphragm above that predetermined pressure. This arrangement provides the booster with a so-called "jump-in" characteristic as will be described further hereinafter.

The invention will be described further, by way of example, with reference to the accompanying drawings, in which:

FIG. 1A is an expanded view of part of the booster of FIG. 1 in the region of the valve arrangement;

FIG. 2 is a side elevation of the valve body member which forms part of the servo-booster of FIG. 1;

FIG. 3 is a sectional view of the valve body member shown in FIG. 2;

FIG. 4 is an end elevation of the valve body member shown in FIGS. 2 and 3; and

FIG. 5 is a perspective view of the corrugated deflecting plate of the booster of FIG. 1.

Figure 1:
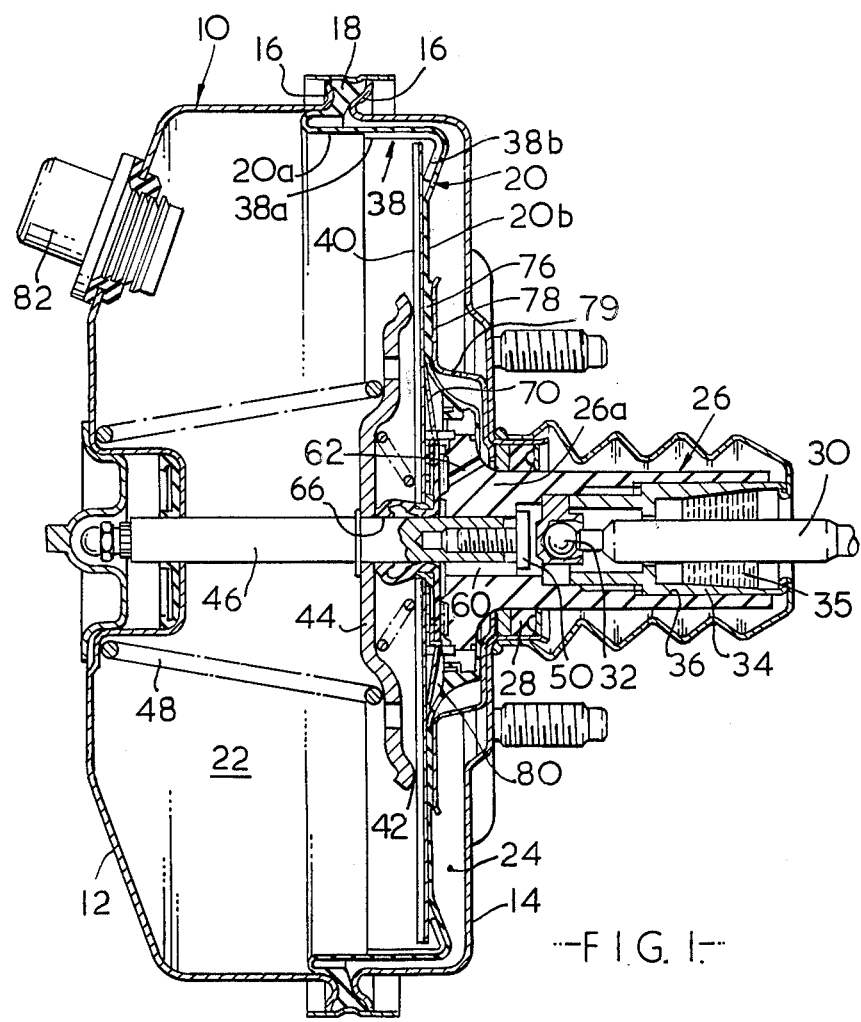
FIG. 1 is a sectional side elevation of one embodiment of a servo-booster in accordance with the present invention.

In the booster shown in the drawings, a housing generally designated by the reference numeral 10 is made up of two cylindrical, cupped parts 12 and 14 which are peripherally formed with radially outwardly directed flanges 16 between which is clamped the outer peripheral edge 18 of an elastic diaphragm 20 serving to divide the interior of the housing 10 into two fluid chambers 22 and 24.

The diaphragm 20 has a substantially cylindrical part 20a and a substantially radial part 20b, the radially inner end of the latter part 20b engaging in a fluid tight manner the periphery of an enlarged diameter forward portion 26a of a valve body member 26 which extends rearwardly through an annular bearing 28 located around an axial aperture defined in the rear wall of the housing part 14. By virtue of this arrangement, the valve body member 26 is slidable relative to the housing 10 upon displacement of an input rod 30 which is connected to the valve body member 26 by a ball and socket joint 32 and a tapered tube 34 containing filter 35 and which is received with an interference fit in a screw-threaded, interior bore 36 in the valve body member 26.

The cylindrical part 20a of the diaphragm 20 is supported by a cylindrical portion 38a of a piston skirt 38 formed of a resilient material and having an inwardly directed portion 38b which extends obliquely as shown in FIG. 1 when in an unstressed state but which can be deformed to extend in a radially inward direction under certain operating conditions of the booster as will be described below.

The radial part 20b of the diaphragm 20 is supported by a so-called deflecting plate 40 which comprises a circular plate of thin resilient material in which radial corrugations 100 (see FIG. 5) have been formed by folding or pressing such that the thickness of the plate 40 is uniform, or some other thickness or thicknesses and each corrugation is of substantially equal pitch. By virtue of this construction, the plate 40 has a relatively high radial stiffness but is relatively weak in a circumferential direction so that it is capable of conical deformation.

The forward surface of the deflecting plate 40 is engaged by a circular fulcrum 42 formed at the periphery of a fulcrum plate 44 carried by an output rod 46, the fulcrum plate 44 being held in engagement with the deflecting plate 40 by means of a helical coil spring 48. The circular fulcrum 42, whose diameter is chosen to suit the boost ratio required for the booster, may be provided with castellations adapted to mate with the corrugations in the deflecting plate 40 so as to avoid denting the thin material of the deflecting plate 40 and thereby losing the radial strength provided by the corrugations. The rearward end of the output rod 46 extends into a reduced diameter portion 36a of the bore 36 and carries a head 50 which engages a shoulder 52 within the bore.

The forward end of the valve body member 26 carries a ring of axially extending castellations or projections 54 which engage the rearward facing surface of the deflection plate 40. Radially inward of the castellations 54, the forward end surface of the valve body member 26 carries a pair of radially spaced, axially projecting, circular valve seats 56, 58, the radially inner one 56 of which extends slightly further forward in the axial direction than the outer seat 58, as shown most clearly in FIG. 3. Radially inwardly of the inner seat 56, an axial passageway 60 communicates with the atmosphere via the internal bore of the tapered tube carried by in the valve body member. Located between the valve seats 56 and 58 are four passages 62 which communicate with the rearward housing chamber 24.

The output rod 46 carries a flexible, annular closure member 64 having a forwardly extending sleeve portion 64a which passes through the inner end of the deflection plate 40 and grips the output rod in a fluid tight manner at 66. In its undistorted state, as illustrated in FIG. 1, the rearward facing surface of the valve closure member 64 is engaged by the inner valve seat 56 but a small clearance exists between this surface and the outer valve seat 58 due to its shorter axial length.

An annular member 70, referred to as the valve transfer plate, is mounted on the valve closure member 64 with the radially inner end of the member 70 lying against the forward facing surface of the radially outer end of the closure member 64. The valve transfer plate 70 has apertures or slots 72 through which the castellations 54 on the valve body member 26 extend with clearance, the radially outer part of this plate 70 extending obliquely forward through an annular space 80 to engage the corrugated deflecting plate 40 at a location 74 which is radially outward of the point of engagement of the castellations with the deflecting plate 40.

The rear surface of the radial part 20b of the diaphragm 20 has a thickened portion 76 which is engaged by a plate 78 connected to the rear housing part 14 and serving as a back-stop for the diaphragm 20. In order to provide a fluid connection between the outlet of the passages 62 in the valve body member 26 and the rear housing chamber 24, either the plate 78 can be provided with apertures 79 or the thickened portion 76 of the diaphragm 20 can be castellated to allow the passage of fluid between itself and the plate 78.

The operation of the abovedescribed booster is as follows.

In the unactuated state illustrated in FIG. 1, the connection to the atmosphere is closed by the engagement of the valve closure member 64 with the inner valve seat 56. However, a connection between the forward and rearward chambers 22, 24 exists via the radial spaces between the corrugated deflecting plate and the diaphragm 20, the space 80, the clearances between the castellations 54 and the valve transfer plate 70, the gap between the valve closure member 64 and the outer valve seat 58, and the passages 62. Since the forward chamber 22 is connected to vacuum via a connection 82, both sides of the diaphragm 20 are thus connected to vacuum in this condition and the booster is said to be "vacuum suspended."

When the input rod 30 is actuated, the valve body member 26 is displaced to the left as viewed in FIG. 1, relative to the housing 10 so that the radially inner end of the deflecting plate 40 is also urged to the left by virtue of its contact with the castellations 54. However, movement of the deflecting plate 40 to the left as a whole is resisted by the spring loaded fulcrum plate so that this movement is accommodated by a conical deformation of the deflecting plate 40 relative to the central axis of the booster. Thus, the radially inner portions of the deflecting plate move forwardly, to the left, and the radially outer portions move rearwardly, to the right.

As a result of this movement and deformation, the outer end of the valve transfer plate 70, which engages the deflecting plate at point 74, is urged rearwardly relative to the valve body member 26. This latter movement is transferred via the valve transfer plate 70 to the valve closure member 64 which closes against the outer valve seat 58, so cutting off the connection between the two chambers 22 and 24. Since the valve transfer plate 70 is only in contact with the deflecting plate 40 at its outer diameter, small movements of the deflecting plate can produce relatively larger movements of the valve closure member and hence only small coning travels are required to operate the valve.

Further movement of the valve body member 26 to the left causes the deflecting plate to cone sufficiently to lift the valve closure member 64 away from the inner valve seat 56. Air is then able to reach the rear housing chamber 24 via the central bore 36 of the valve body member 26, the passage 60, and the passages 62. Since the forward chamber 22 is still connected to vacuum, a pressure differential then exists across the diaphragm 20 and the movable wall formed by the diaphragm and the deflecting plate moves to the left against the force of the return spring 48, this movement being transferred to the output rod 46 via the fulcrum plate 74, to operate the vehicle brakes.

When the force on the input rod 30 is removed, the movable wall is returned by the spring 48 and the booster returns to its initial "vacuum suspended" condition. It will be observed that, unlike the arrangement described in our prior British patent specifications Nos. 1,144,566 and 1,144,567 in which the deflecting plate pivots about different radii when the pressure differential across the movable wall is increasing and decreasing respectively, in the present arrangement, the deflecting plate pivots only about a single radius, defined by the castellations 54 on the valve body member 26, both for increasing and decreasing pressures across the movable wall. Thus, there is a fixed boost ratio for increasing and decreasing pressures so avoiding the hysteresis effect characteristic of the earlier designs described in the aforementioned patents.

It is a further characteristic of conventional boosters that an undesirably heavy input load must be applied before an output appears due, inter alia, to the number of seals necessary in the booster with their accompanying friction. It is thus desirable to provide what is known as a "jump-in" characteristic which may be described by the consideration that the approximate graph of output load against input load is an inclined straight line through the origin. However, due to the aforementioned seal friction etc., the input load has a positive valve before the output becomes effective. "Jump-in" is provided to achieve coincidence of the practical graph with the theoretical graph once the seal friction has been overcome.

"Jump-in" is provided in the present embodiment as follows. As described above, thee piston skirt portion 38*b* is initially of frusto-conical shape so that it only engages the deflecting plate at its inner end. Thus, the initial area of the diaphragm over which pressure is effective on the deflecting plate is an annulus whose outer diameter lies in the region where the inner end of the skirt portion 38*b* contacts the deflecting plate and whose inner diameter is approximately at the region where the outer edge of the valve transfer plate contacts the deflecting plate. However, when a certain pressure differential across the diaphragm is reached, the inwardly extending skirt portion 38*b* is pressed flat against the outer end of the rearward facing surface so that the outer diameter of said annulus is then substantially equal to the diameter of the deflecting plate. The effect of this is to change the centre of pressure on the diaphragm such as to make a given pressure more effective to displace the movable wall to the left and provide a corresponding output force.

The result of an applied force to the valve body member is thus a small jump in the pressure differential across the diaphragm before an equilibrium condition is reached. This "jump-in" is chosen to be of a suitable magnitude to counteract the friction of the seals on the master cylinder so that the operator (driver) of the vehicle does not notice the irregularity of the pedal loads which these would otherwise produce.

1. A differential-pressure operated servo booster, of the type in which a load actuating member is displaceable by the application of differential fluid pressure across a movable wall, including a valve arranged to selectably alter the pressure on one side of the movable wall relative to that on the other side, the valve comprising a valve body member, a flexible, annular closure member adapted to co-operate with a pair of relatively stationary and substantially concentric annular valve seats on the valve body member, and an annular deflecting plate for selectably deflecting the closure member about the valve seats to control said differential fluid pressure across the wall, wherein a means is provided which forms a mechanical connection between the valve body member and the deflecting plate at a location radially outwardly of the annular valve closure member for transmitting input loads applied to the booster directly from the valve body member to the deflecting plate.

2. A servo booster according to claim 1 in which the valve body member has a plurality of projections thereon which directly engage the deflecting plate for providing said load transfer.

3. A servo booster according to claim 2 in which the deflecting plate comprises an annular disc of resilient sheet material the surface of which is continuously corrugated with radial corrugations.

4. A servo booster as claimed in claim 1 of the type in which the valve body member has a pair of radially spaced passage means therein, the inner one of said concentric valve seats circumscribing one of said passage means and the outer of said valve seats circumscribing both of said passage means, and the annular valve closure member being selectably engageable with and capable of conically deforming about the whole circumference of each seat under the action of the deflectng plate to respectively connect and disconnect said passage means, wherein the radially inner of the valve seats extends further forward in the axial direction towards the closure member than the outer seat, whereby a clearance exists between the closure member and the outer seat in the unactuated state of the booster.

5. A servo booster according to claim 1, further comprising an annular plate member which is connected to the valve closure member and is adapted to engage the deflecting plate at a location outwardly of said projections whereby to aid the closure of the outer valve on conical deformation of the deflecting member.

6. A differential pressure operated servo booster, of the type in which a load actuating member is displaceable by the application of differential fluid pressure to a movable wall in the form of an annular elastic diaphragm, including a valve arranged to selectably alter the pressure on one side of the diaphragm relative to that on the other side, the valve including a flexible valve closure member and an annular deflecting plate for selectably deflecting the valve closure member to control said differential pressure across the diaphragm, the diaphragm being circumferentially supported by a piston skirt which is formed of resilient material and which has a cylindrical portion which lies radially outwardly of the deflecting plate and an inwardly extending flange portion, wherein said inwardly directed flange portion is coned relative to the booster axis in the unactuated state of the booster such that its inner end engages the deflecting plate at a region inwardly of the periphery thereof but which is deformed so as to lie normal to the booster axis and flat against the deflecting plate when a predetermined pressure differential across the diaphragm has been exceeded, whereby to increase the effective area of the diaphragm above that predetermined pressure.

7. In a differential-pressure operated servo booster, of the type in which a load actuating member is displaceable by the application of differential fluid pressure across a movable wall, and including a valve arranged to selectably alter the pressure on one side of the moveable wall relative to that on the other side, the valve including a flexible valve closure member and an annular deflecting plate, said deflecting plate comprising an annular disc of resilient sheet material the whole surface of which is corrugated with radially extending, alternate flat-topped ridges and flat-bottomed channels of substantially equal pitch and uniform depth which extend from the inner to the outer periphery of the disc.

* * * * *